United States Patent

[11] 3,624,617

[72] Inventors Harry Putterman Elizabeth; Peter A. Jager, Haledon; Theodore Urbanik, Jr., Dover; Joseph A. Lake, Jr., Butler, all of N.J.

[21] Appl. No. 882,746
[22] Filed Dec. 5, 1969
[45] Patented Nov. 30, 1971
[73] Assignee The Singer Company New York, N.Y.

[54] MEMORY PROTECTION CIRCUIT
14 Claims, 7 Drawing Figs.

[52] U.S. Cl. .......... 340/172.5
[51] Int. Cl. .......... G11c 7/02
[50] Field of Search .......... 340/172.5, 146.1

[56] References Cited

UNITED STATES PATENTS

| | | | |
|---|---|---|---|
| 2,961,535 | 11/1960 | Lanning | 340/172.5 |
| 3,196,402 | 7/1965 | Gehring, Jr. et al. | 340/172.5 |
| 3,319,229 | 5/1967 | Fuhr et al. | 340/172.5 |
| 3,321,747 | 5/1967 | Adamson | 340/172.5 |
| 3,443,116 | 5/1969 | Mann et al. | 340/146.1 X |

*Primary Examiner*—Raulfe B. Zache
*Assistant Examiner*—Paul R. Woods
*Attorneys*—S. A. Giarratana and S. Michael Bender

ABSTRACT: A memory protection circuit for a computer having a destructive readout memory. In such memories, data stored in the memory cores may be lost if computer operation is attempted when any one of a plurality of power sources for the computer memory section is not operating within its specified tolerance. Means are provided for sensing the output of each of the power sources and producing a signal when all of the sources are at their proper level to permit operation of the computer. In a preferred embodiment, sensing circuits are provided for each of the power sources. The outputs from the sensing circuits provide inputs to a gate circuit. When all of the supply voltages are within specific tolerances, the gate circuit provides a signal which indicates that the memory operation may be initiated. If any one of the power sources fails during operation, the signal from the gate circuit causes a detection logic circuit to provide an output signal which indicates power failure. The power failure signal is provided to the computer logic to inhibit operation of the computer clock source and to cut off an enabling voltage source to the read/write current regulators in the computer until the voltages reassume their proper value and a logic initialization pulse is produced in the manner previously described. However, in order to prevent the loss of data, circuit means are provided which permit a memory cycle which has been initiated to be completed.

INVENTORS
HARRY PUTTERMAN
PETER A. JAGER
THEODORE URBANIK, JR. &
JOSEPH A. LAKE, JR.

BY [signature]
ATTORNEY

INVENTORS
HARRY PUTTERMAN
PETER A. JAGER
THEODORE URBANIK, JR. &
JOSEPH A. LAKE, JR.

BY S. A. Giarratana
ATTORNEYS

INVENTORS
HARRY PUTTERMAN
PETER A. JAGER
THEODORE URBANIK, JR. &
JOSEPH A. LAKE, JR.

BY

ATTORNEY

INVENTORS
HARRY PUTTERMAN
PETER A. JAGER
THEODORE URBANIK, JR. &
JOSEPH A. LAKE, JR.

BY
S. A. Giarratana
ATTORNEY

MEMORY PROTECTION CIRCUIT

BACKGROUND OF THE INVENTION

This invention relates to a protection circuit for a computer having a destructive readout memory.

In general, memory cores in the memory of a computer may be classified in accordance with whether or not the data stored therein is destroyed when the memory is read. Since there are significant cost and size advantages which accompany the use of destructive readout memory cores, adequate provision must be made in order to preserve the data stored in the memory core against loss or change.

Thus, it is well known in the art to provide circuit means for performing a typical memory cycle which generally consists of a read cycle and a write cycle. During the read cycle, the data stored in the memory core is transferred to a register in the computer central processing unit for ready return to the computer memory cores during the write cycle. While such arrangements also generally include provisions for a clear-write cycle in which the data stored in the memory is intentionally destroyed and new data is stored therein, this invention is primarily concerned with the preservation of data during the read-write cycle described above. Since such read-write cycles require completion in order to preserve the data in the memory core, it is necessary to provide means for completing the cycle in the event of power loss to the memory, and to prevent operation of the memory until all the power supplies to the memory are at a level that will insure the satisfactory operation of the computer.

SUMMARY OF THE INVENTION

In order to overcome the problems of the prior art with respect to preserving the data stored in a memory core in the memory of a computer during the read-write cycle, this invention is related to a protection circuit to protect the memory contents against inadvertent loss because of power failure or power transients. The protection circuit according to the invention provides means which preclude operation of a memory until all of the supply voltages are at their nominal level. Input sensing circuits are provided for each of the plurality of power supplies to the memory. When all of the voltage power supplies are within their accepted tolerances, means are provided for generating a signal indicative of this condition which, through appropriate circuit means, indicates that the computer logic in the memory may operate to perform the desired computer functions. In a preferred embodiment, circuit means are provided for sensing each of the input power supplies and providing to a gate circuit an input which represents that such power supply is at its operating level. The output of the gate circuit is coupled to a detection logic circuit. When the input sensing circuits detect a voltage failure on any one of the memory power supplies, the detection logic circuit will transmit a power failure signal to the computer. The circuit will also provide a signal which will inhibit the initiation of a new memory cycle. The protection circuit also includes means to disable the voltage supply to the read-write current regulators, thus to inhibit further extraction of data in the computer memory. The circuit according to the invention, however, is arranged so that if a memory cycle has been initiated at the time that the power from any one of the voltage supplies fails, the memory cycle may be completed. Thus, data readout during the read-write cycle may be restored to the memory core before the memory is rendered inoperative because of the loss of power from any one of the power supplies.

DESCRIPTION OF THE PREFERRED EMBODIMENTS

It is an aspect of the environment in which the circuit of the invention may be used that the computer memory will operate satisfactorily not only when the power supplies are at their nominal voltage, but also at voltage levels that are below nominal by two to 2.5 times their specified tolerances. Where there is a loss of power from any one of the power supplies at the memory terminals, the decay rate of the power supply voltage is finite. It is also a feature of the circuit environment that the rate of decay from a level where power failure is detected to the minimum level for computer operation is at least equal to or greater than the memory cycle, for example, 5 microseconds. Thus, it is a feature of the invention to detect the failure of the power supply voltage at such time in its decay cycle that the memory cycle may be completed.

Figures 1, 2:
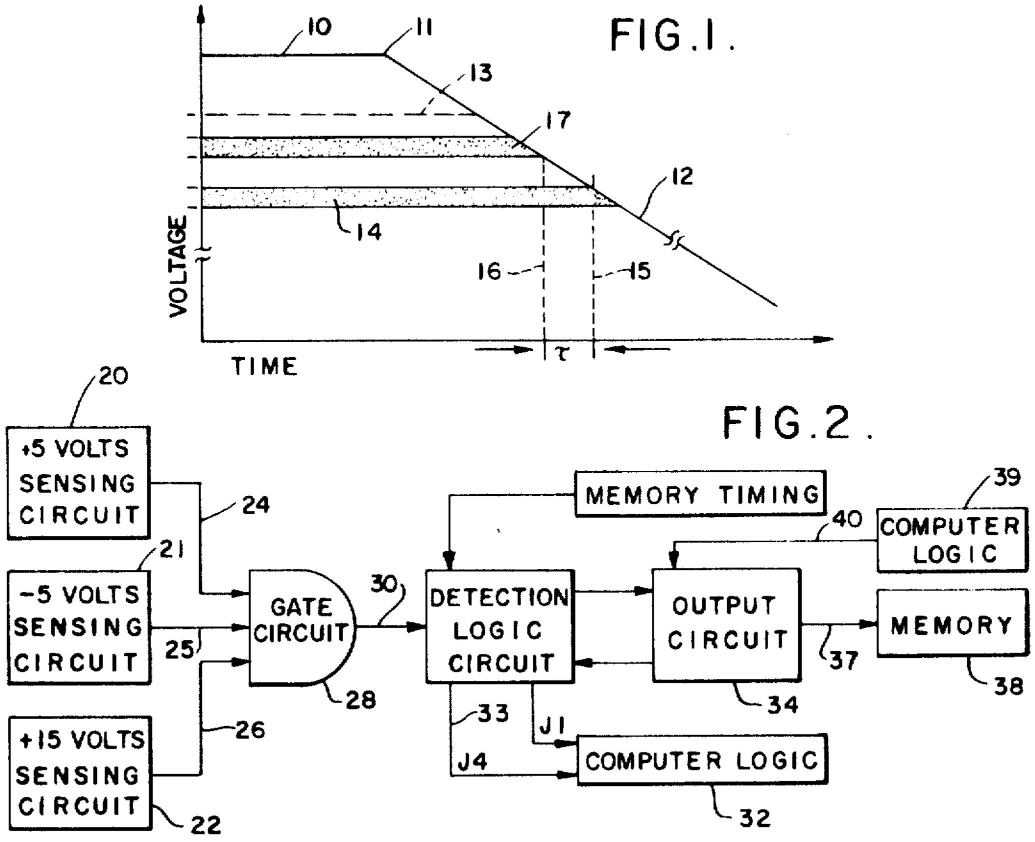
FIG. 1 is a representative plot of the voltage from a source showing its finite decay characteristic after interruption.
FIG. 2 is a block diagram of the protection circuit according to the invention.

These design concepts are illustrated in FIG. 1 which shows a plot 10 of the nominal level of a power supply voltage to the memory. The power supply voltage is illustrated as beginning its decay, representing loss of power, at a time designated at the knee of the curve by reference numeral 11, so that the supply voltage decays at a finite rate generally designated by the portion of the curve 12.

The voltage level designated at 13 defines the accepted voltage tolerance from the power supply level. Thus, the nominal range at which the computer will operate satisfactorily is indicated by supply voltages which lie between the levels designated at 10 and 13 respectively. Assuming that the memory will operate satisfactorily at a voltage level outside of the nominal voltage range, such as at the voltages designated by the stippled area 14 in FIG. 1, the memory will operate satisfactorily even under a voltage decaying condition until the time designated on the graph by reference numeral 15. If the time for a memory cycle is 5 microseconds, for example, detection of the decaying voltage up to a time designated by numeral 16 on the curve will permit completion of the memory cycle even under the condition of power supply failure if the time differential between time 15 and time 16 is greater than 5 microseconds. Thus, if the power failure can be detected by appropriate circuitry within a range of supply voltages designated by the stippled area of the curve 17, completion of the memory cycle is assured.

FIG. 2 is an illustration of a block diagram of the power failure protection circuit according to the invention for use with a memory which utilizes, for example, power supplies of +5 volts, −5 volts, and +15 volts respectively.

The circuit includes an input sensing circuit 20 for sensing the output of the +5 volt power supply, an input sensing circuit 21 for sensing the output of the −5 volt power supply, and an input sensing circuit 22 for sensing the output of +15 volt power supply. In general, each of the sensing circuits 20, 21 and 22 is capable of detecting a change in the voltage supply from a specified tolerance from the nominal level and at least within the range specified by reference numeral 14 in FIG. 1. In a preferred embodiment, each of the input sensing circuits is capable of detecting when the output of the particular power supply is within 5 percent of its nominal value.

Each of the input sensing circuits provides a signal at its output which indicates whether the voltage being sensed is within the specified range. The outputs from each of the input sensing circuits 20, 21 and 22 is connected by leads 24, 25 and 26, respectively, to provide the inputs to a gate circuit 28. The gate circuit 28 is preferable an AND gate and is connected by lead 30 to a detection logic circuit 31. When the voltage supplies are all within the specified tolerance, as indicated by the signal level on leads 24, 25 and 26, AND-gate 28 provides a signal on its output lead 30 which enables the detection logic circuit 31. When the detection logic circuit 31 is enabled, it transmits a logic initialization signal J1 to the computer logic.

On the other hand, when any one of the input voltage power supplies falls below its specified level, AND-gate 28 provides a signal which causes the detection logic circuit 31 to transmit an inhibit signal J4 to the computer logic 32 on lead 33. The inhibit signal J4 is used by the computer logic to inhibit the master computer clock.

Under a power failure condition in any one of the power supplies, the output circuit 34 receives a signal from the detection logic circuit 31 and provides a corresponding signal on lead 37 which disables the read-write current regulators in the computer memory 38. In addition, under this condition, the output circuit 34 provides a signal which inhibits the memory cycle initiating signals which are generated by the computer logic circuit 39 and transmitted to the output circuit 34 by lead 40.

Thus, the circuit represented by the block diagrams of FIG. 2: (1) provides a signal J1 which indicates that all power supplies are at an output level which is within a specified tolerance; (2) provides a signal J4 which indicates that at least one of the power supplies is below its specified level and which is used by the computer logic circuitry to inhibit the master computer clock; (3) provides a signal upon power failure in any one supply which is used to inhibit the initiation of a new memory cycle without interrupting the memory cycle in process; and (4) provides a signal which cuts off the critical enabling voltage to the read-write current regulators. It should be noted that either the functions designated (3) and (4) above is sufficient to protect the memory contents.

Figure 3:
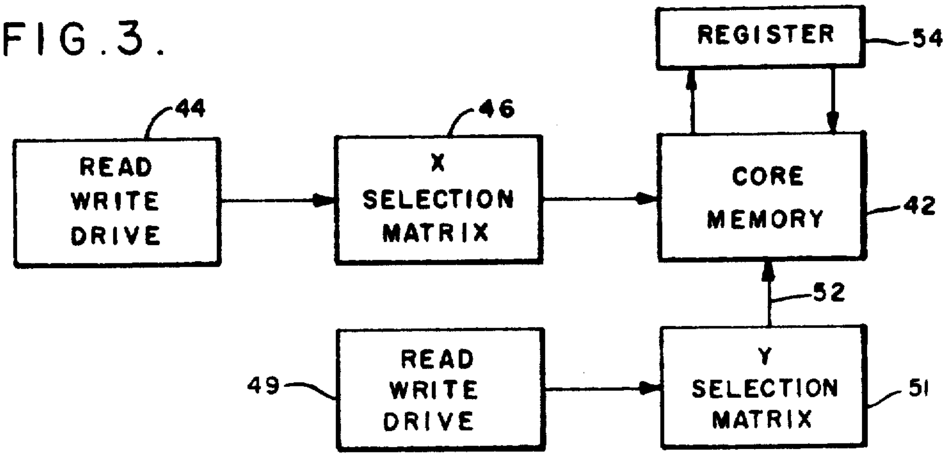
FIG. 3 is a block diagram of representative circuit elements to provide the basis for a description of a typical read-write cycle in a destructive readout memory.

FIG. 3 is a block diagram of the operative features of a core memory with which the circuit according to the invention may be used. In a typical memory core, the ferromagnetic core element includes an X-selection current winding, a Y-selection current winding, a sensing winding, and an inhibit or digit winding. Such memory cores exhibit a generally square hysteresis curve in which the flux density at saturation in a first direction may be arbitrarily defined as a logical "1" and the flux density at saturation in the other direction is arbitrarily defined as a logical "0." Thus, when a predetermined memory core is addressed by the coincidence of X- and Y-currents in the appropriate windings and contains a logical "1," the sense winding will indicate a large amount of flux. On the other hand, if the addressed memory core is in its "0" logical state, a low output is obtained from the sensing winding.

It is a feature of destructive readout memory cores that, regardless of whether the addressed core contains a logical "1" or a logical "0," the core will be switched to its "0" state following the read cycle. Thus, the coincidence of the read pulse in the X-selection winding and the read pulse in the Y-selection winding together with strobe pulses, if used, is such that the core is driven from its logical "1" state to its logical "0" state. On the other hand, if the core is already in its "0" logical state, it remains in a logical "0" state. Thus, the readout cycle destroys whatever data is contained in the memory core.

The selection of a stack of such memory cores in a three dimensional array is depicted diagrammatically in FIG. 3. A read-write drive circuit 44 is connected to an X-selection matrix 46 which is in turn connected to the core memory 42. Similarly, a read-write drive circuit 49 is connected to a Y-selection matrix 51 which is in turn connected to the core memory. The read-write drivers 44 and 49 generate the read and write pulses, which are applied to the X- and Y-selection windings of the core matrix 42. The X- and Y-selection matrices direct the read and write pulses to the proper X- and Y-selection windings of the core matrix to read out a selected stack of cores and then restore the readout date to the selected stack of cores. In this manner, the X-selection matrix and the Y-selection matrix cooperate to select a particular stack of cores from the three dimensional array for reading out the stored digital data in binary form to form a binary word.

The data from the selected stack of memory cores in core memory 42 is read out into register 54. Thus, all of the binary digital data in the form of a binary digital word previously stored in the selected stack of cores in the core memory 42 are stored in the binary data register 54. One storage technique utilizes a plurality of flip-flops, each flip-flop being switched to a logical state which corresponds to the logical state of a corresponding memory core. Such storage is necessary so that the binary data contained in the core is not lost by the action of the destructive readout memory cycle. In this manner, upon the activation of a write or restore cycle, the data stored in the digital register 54 may be returned to the core memory 42 to be read out again at a later time.

If the read-write cycle is not completed, the information will be destroyed. Accordingly, it is a primary feature of the invention to permit the completion of a memory cycle so that the data is not lost once the memory cycle is initiated.

By the way of additional background, the data in a core in any stack of cores may be intentionally destroyed and new binary data inserted therein. This operation is generally designated as operation of the computer in the clear-write mode. The operation of the memory protection circuit of the invention is primarily concerned, however, with the read-write mode.

Figure 4A:
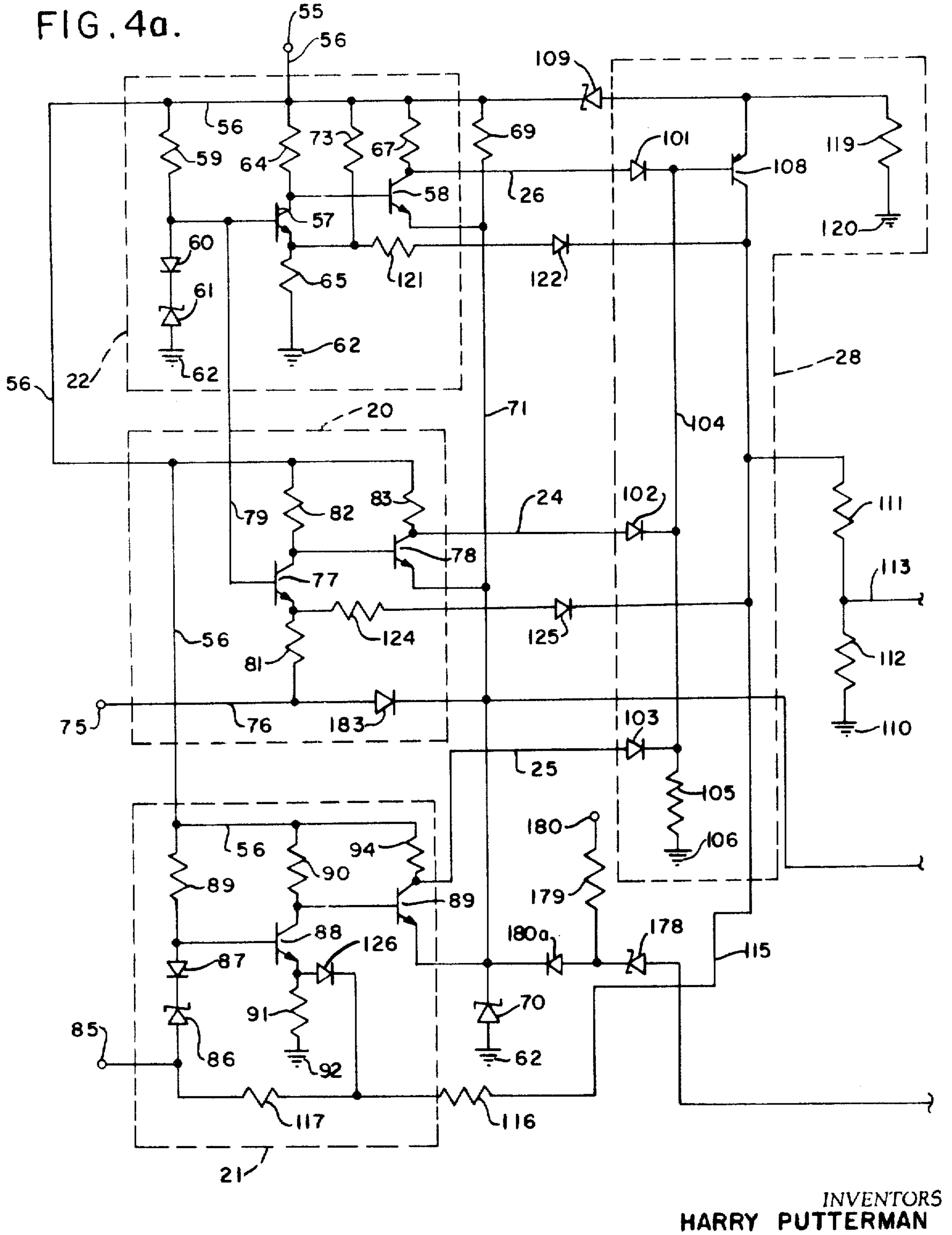
FIGS. 4A and 4B represent the left portion and right portion respectively of a preferred embodiment of the protection circuit according to the invention.
Figure 4B:
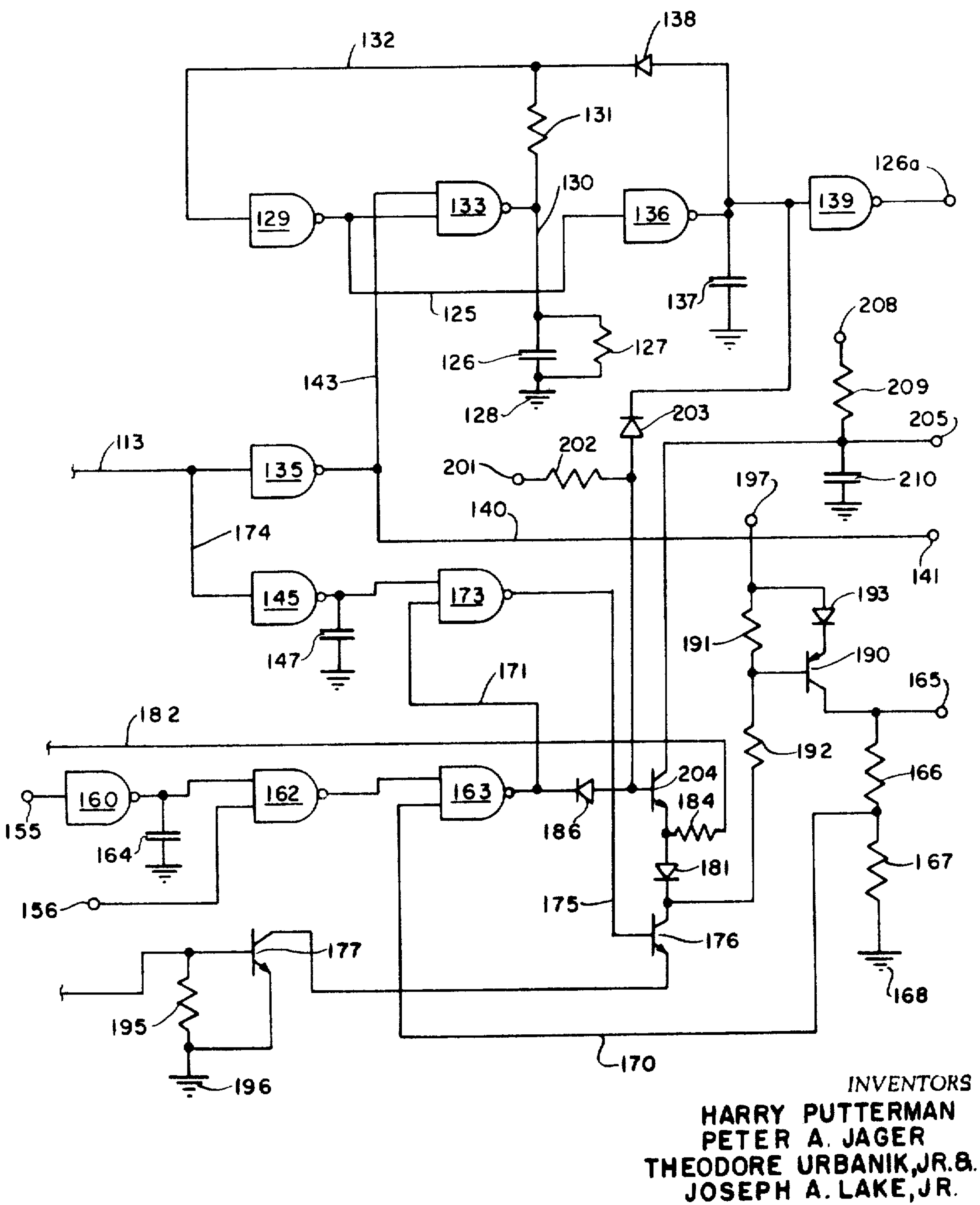

FIGS. 4A and 4B represent a detailed circuit diagram of the preferred embodiment of memory protection circuit according to the invention.

The +15, +5 and −5 volt sensing stages shown in phantom blocks are labeled in FIG. 4A with numerals 22, 20 and 21 respectively to correspond with like numerals used in FIG. 2. As previously discussed in connection with FIG. 2, a source of potential, such as +15 volts is supplied to the input sensing circuits at input terminal 55 to provide a source of potential by way of a number of biasing leads designated at 56. Thus all of the leads labeled 56 are at a +15 volts with respect to ground.

The +15 volt sensing circuit 22 comprises a transistor 57 having its collector output connected to the base of a transistor 58. The base of the transistor 57 is biased by a resistor 59 in series circuit with a diode 60 and a zener diode 61 connected between the bias lead 56 and a source of reference potential, such as ground 62. Throughout this specification, the term "ground" and "source of reference potential" are used interchangeably. The transistor 57 is also biased by a resistor 64 connected between bias lead 56 and its collector, while its emitter is connected to a source of reference potential 62 through an emitter resistor 65.

The transistor 58 has its collector connected to lead 56 through a collector resistor 67 and its emitter connected to the common junction between a resistor 69 in circuit with zener diode 70 by lead 71. The series circuit of resistor 69, lead 71, and zener diode 70 are connected between the source of bias potential and a source of reference potential 62. Resistor 73 is connected between bias lead 56 and the emitter of transistor 57. The values of the components are chosen, as is well known in the art, so that transistor 57 acts as a voltage amplifier. The base of the transistor 57 is clamped at a potential determined by the zener potential across zener diode 61 plus the minor voltage drop across diode 60. Since the sensing stage 22 is intended to sense +15 volts, the collector output from transistor 57 is at a voltage of +15 volts minus the voltage drop across the collector resistor 64. The output from the collector of transistor 57 provides the input to the base of transistor 58 which, in conjunction with transistor 57, is biased to cut off until the supply voltage at terminal 55 reaches a predetermined percentage, such as 95 percent, of its nominal value.

The function of the input sensing circuit 22 is to provide an output signal on lead 26 to reverse the bias on diode 101 when the supply is within a stated percentage of its nominal. Thus, with the base of transistor 57 clamped as previously discussed, both the collector voltage and the emitter voltage become more positive after the supply voltage at terminal 55 is turned on through resistor 64 and resistor 73 respectively. By effectively sizing resistor 73, resistor 65, and, to a lesser extent, resistor 64, transistor 58 can be made to turn on at the desired voltage. Accordingly, when transistor 58 becomes conductive, an output signal occurs on lead 26 to provide one of the inputs to the gate circuit 28 as previously discussed. Thus, the presence of a signal on lead 26 indicates that the +15 volt supply has reached its nominal voltage. In the case of a failure of the +15 volt supply, the transistor 58 becomes nonconductive and the signal on lead 26 effective to forward bias diode 101.

The +5 volt sensing circuit 20 operates in a manner similar to the +15 volt sensing circuit 22. A +5 volt input is provided at terminal 75 to lead 76. The sensing stage 20 includes a transistor 77 having its collector connected to the base of a transistor 78. The base of transistor 77 is connected to the base of transistor 57 by lead 79 and to the common junction between resistor 59 and diode 60 in the +15 volt sensing stage 22. Accordingly, the base of transistor 77 is clamped to the zener potential of zener diode 61 plus the potential drop across diode 60. The emitter of the transistor 77 is biased by the emitter resistor 81 and its collector is biased by a collector resistor 82 connected to bias lead 56. The collector of transistor 78 is biased by a collector resistor 83 which is also connected to the positive lead 56, while the emitter of transistor 78 is connected to lead 71. Thus, the emitter of transistor 78 is clamped to the potential across zener diode 70.

The voltage on lead 76 which was provided to the emitter of transistor 77 through resistor 81 is the +5 voltage supply being sensed. The change in voltage across the emitter resistor 81 is amplified across the collector resistor 82 by the ratio of resistor 82 to resistor 81. This amplified voltage is applied to the base of transistor 78 which is biased to be normally nonconductive. When the voltage supply to terminal 75 reaches a certain percentage, such as 95 percent, of its nominal value, transistor 78 becomes conductive to provide a signal on lead 24 effective to reverse the bias on diode 102. The signal on lead 24 provides a second input to the gate circuit 28 discussed in connection with FIG. 2. If the +5 volt supply fails, transistor 78 again becomes nonconductive and the signal on lead 24 forward biases diode 102.

The −5 volt sensing stage 21 operates in a manner similar to the input sensing stages 22 and 20 previously discussed. A −5 volt source is provided to terminal 85 which is connected to the cathode of a zener diode 86 in series with a diode 87. The base of a normally nonconductive transistor 89 is connected to the collector of amplifying transistor 88, and its collector is connected to the positive bus 56 through a biasing resistor 94. The emitter of transistor 89 is connected to lead 71 where it is clamped to the potential across zener diode 70.

The base of transistor 88 is connected to the common junction between a biasing resistor 89 and diode 87. The transistor 88 is biased by a collector resistor 90 connected between the positive bus 56 and the collector of transistor 88, while its emitter is connected to a source of reference potential such as ground 92 through resistor 91.

When the −5 volt supply is turned on, the input to the base of transistor 88 will exceed the voltage supply at terminal 85 by an amount equal to the zener potential across zener diode 86 and the voltage drop across diode 87. As the voltage at input 85 drops toward −5 volts, the voltage at the emitter of transistor 88 will drop. The voltage at the emitter of transistor 88 is thus amplified by transistor 88 on the collector thereof so that at a predetermined percentage of a nominal level, e.g. 95 percent, transistor 89 conducts to provide an output on lead 25 in a manner similar to the other input sensing stages. A signal on lead 25 provides the third input to gate circuit 28 and indicates that the −5 volt supply has reached its nominal voltage. If the −5 volt supply fails, transistor 89 becomes nonconductive and the signal on lead 25 forward biases diode 103.

An AND-gate 28 is shown in phantom outline in FIG. 4A and corresponds to the gate-circuit 28 shown in FIG. 2. The AND-circuit 28 comprises a plurality of diodes 101, 102 and 103 connected to the outputs of the sensing circuits from the collectors of transistors 58, 78 and 89 respectively on leads 26, 24 and 25.

The cathodes of the diodes 101, 102 and 103 are connected to a common lead 104 which is in circuit with resistor 105 connected to ground 106.

The signal on lead 104 provides the input to the base of transistor 108 having its emitter connected to the positive lead 56 through zener diode 109 and its collector connected to a source of reference potential 110 through resistors 111 and 112 respectively. The output from the AND-gate 28 is taken from lead 113 at the common junction between resistors 111 and 112. The collector of transistor 108 is also connected by lead 115, resistor 116 and resistor 117 to the −5 volt source at terminal 85.

Resistor 105 is sized relative to collector resistors 67, 83 and 94 of transistors 58, 78 and 89 respectively so that transistor 108 is saturated only when the three input stages 22, 20 and 21 are providing an output signal. These outputs, as previously discussed, indicate that the respective supply voltages are within their nominal range. When any of the input sensing stages are not providing such an output, such as in the case of supply voltages which have not yet reached their nominal range, or because of a loss of supply voltage to any one or more of the input stages, the signal applied to the base of transistor 108 is more positive than its emitter voltage and transistor 108, a PNP-transistor, is rendered nonconductive. When transistor 108 is turned off, no output signal appears on lead 113 across resistor 112. In this specification, the absence of a signal will be referred to as a logical "0," or low, signal, while the presence of a signal will be referred to as a logical "1,"or high, signal. Thus, on the other hand, when transistor 108 is conducting, the output from the collector across resistor 111 is such as to provide a logical "1" output on lead 113 from the AND circuit.

Resistor 119 is connected between the zener diode 109 and a source of reference potential 120 to provide a current for the zener diode 109. Zener diode 109 operates to prevent transistor 108 from becoming conductive when the +15 volt supply is low, so that the conduction of transistor 108 is controlled by the signal at its base.

Feedback is provided from the collector of transistor 108 to the emitter of transistor 57 through a resistor 121 in series with a diode 122. Similarly, feedback is provided to the emitter of transistor 77 through a resistor 124 in series with a diode 125 and to the emitter of transistor 88 through a diode 126 in series with a resistor 116. The feedback from the AND-circuit 28 to the input sensing stages 22, 20 and 21, prevents oscillation of transistor 108. As transistor 108 becomes nonconducting, indicating the absence of an output from any one of the input sensing stages, diodes 122, 125 and 126 become forward biased and conduct such as to draw current from the emitter of transistors 57, 77 and 88 respectively. These current paths, in turn, cause transistor 108 to turn off more rapidly and thus assist the switching speed of the AND-gate 28.

One of the functions of the circuit is to generate an initialization signal J1 which indicates that all of the power supplies are within their nominal level. The initialization signal J1 is generated on lead 125 in FIG. 4B and is available for transmission to the computer at terminal 126*a*. When the power to he circuit is first turned on, the capacitor 126 is discharged through resistor 127 to ground 128. Accordingly, the input to an inverter 129 by way of lead 130, resistor 131 and lead 132 to inverter 129 is initially low. Inverter 129 thus provides an initially high output to gate 133. Gate 133 and all other gates illustrated with the same connection as gate 133 are characterized in that when either input to such a gate is low, its output is high, and when both of its inputs are high, its output is low.

As discussed, when the magnitude of any one or more of the input voltages are below nominal, a low signal appears on lead 113. Thus, at the time the power supplies are turned on, the signal on lead 113 is low and the output from inverter 135 is high. The high output from inverter 135 is provided to gate 133, and since the output of inverter 129 is initially high, the initial output of gate 133 is low, maintaining capacitor 126 in its discharged state.

When the signal on lead 113 goes high, the output signal from inverter 135 goes low causing the output from gate 133 to go high, thus charging capacitor 126. The output from gate 133 reaches a logical high at a time determined by the time constant of capacitor 126 and resistor 127. Preferably, this time constant is a minimum of 100 microseconds to permit the computer to complete its turn on procedure.

The rising signal on capacitor 126 is transmitted to the input of inverter 129 and after the period of charge previously discussed, the output of inverter 129 goes low. Thus, both inputs to gate 133 are low, its output is maintained or latched high. The output of the inverter 129 is applied to lead 125 to provide the J1 signal. Thus, when the output of gate 133 becomes latched high, the J1 signal becomes latched low.

Initially, the high signal J1 on lead 125 at the input of gate 133 causes a low output from inverter 136 maintaining a capacitor 137 in its discharged state. Thus, diode 138 is initially nonconductive. The ultimate output in the initial state is a high signal at output 126 from inverter 139.

When the J1 signal goes low when all supply voltages are operative at nominal, the output of inverter 136 goes high causing diode 138 to conduct and capacitor 137 to charge. Thus, the operation of capacitor 137 and diode 138 insure the maintenance of a high input to inverter 129 after the signal on lead 113 goes high as previously discussed. Under this condition, the output signal at terminal **126*a* is at a logical low for use by the computer. If the computer is designed to respond to an opposite logical output, inverter 139** may be eliminated.

A second function of the detection logic circuit is to generate a voltage failure signal J4 to inhibit the computer master clock. The J4 signal is generated on line 140 in FIG. 4B, whenever any supply voltage falls below its specified level. When the voltages have reached their nominal level, the signal on line 113 from the AND-gate 28 goes from low to high. Thus, the output from inverter 129 changes from high to low so that the state of J4 is low during proper computer operation.

If any one of the voltages of the respective power supplies falls below its acceptable level during operation, the output from gate 28 switches from a high to a low state. Under this condition, the memory protection circuit also functions to cut off the critical enabling voltage to the read-write current regulators and inhibits the initiation of a new memory cycle while permitting the completion of any memory cycle which is then in process. Thus, when the input to gate 135 on lead 113 from gate 28 switches from high to low, the output of gate 135 switches from low to high, whereupon the J4 power failure signal shifts from low to high on lead !140 and is available at the power failure output terminal 141 to be used by the computer to inhibit the computer master clock.

During acceptable operating levels, the input to inverter 145 is in its high state, whereupon its output is low, and capacitor 147 is in its discharged state. When a power failure occurs, the input to the inverter 145 switches from high to low as previously discussed, whereupon the output from the inverter 145 switches from low to high and capacitor 147 begins to charge. At a predetermined time after the change of state at the output of inverter 145, such as at a minimum of 600 nanoseconds after the J4 voltage failure discrete has been issued, the output voltage of inverter 145 rises to a value at which it can cause a critical enabling voltage to the read-write current regulators to be cut off. The capacitor 147 determines the time for the output voltage of the inverter 145 to rise to a value to cause cut off of the critical enabling voltage after the power failure signal J4 has issued. The minimum time delay provided by the capacitor 147 is determined by the maximum time for the computer to issue a cycle initialization pulse after it has issued a master clock pulse. Once a master clock pulse has issued from the computer clock, the cycle may begin and go to completion regardless of a state of power failure.

If the circuit did not include a delay, a power failure signal J4 which occurred immediately after a master clock pulse would inhibit a read and restore cycle of the memory. However, since it is preferable to interlock the computer to he memory, this circuit is designed so that the read and restore cycle is not inhibited once a master clock pulse is generated.

Figure 5:
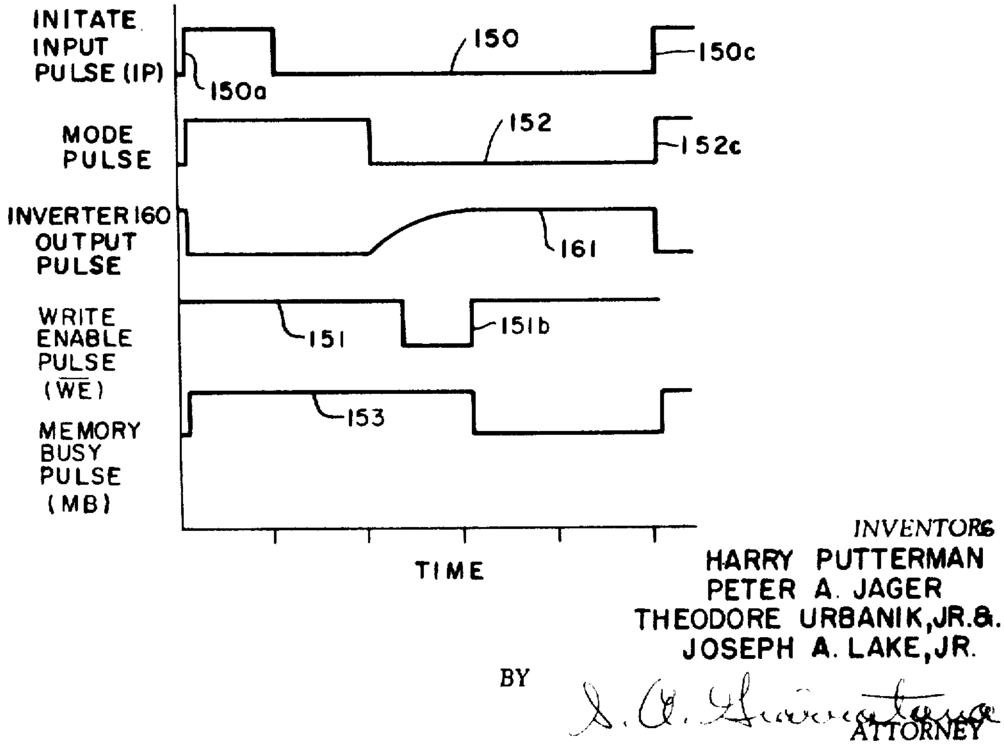
FIG. 5 is a plot of various pulses supplied to or provided by the circuit of FIG. 4; and, FIG. 6 is a circuit diagram partially in block form showing the read-write current regulators and their supply voltage in circuit with a representative selection matrix.

FIG. 5 is helpful for background on the manner by which the memory protection circuit permits a read-write cycle to be completed before the initialization pulse is inhibited and the critical voltage to the read-write current regulator is turned off.

FIG. 5 shows the relative timing of a number of pulses in the circuit which are either provided to or by the circuit shown in FIG. 4B. A typical read-write memory cycle begins with the leading edge **150*a* of an initiate input pulse 150 and ends with the trailing edge 151*b* of a write-enable pulse 151. The operation of a read-write memory cycle having an initiate input signal and a write-enabling signal has previously been discussed in connection with the read-write current regulators of FIG. 3. The master clock for the computer circuit provides the initiate pulse and the write enable pulse in a sequence at predetermined times in the cycle. Thus, for illustration it can be seen that the initiate pulse 150 repeats at the portion of the curve designated 150*c*. Similarly, a mode pulse 152 is generated which is also coordinated in time with the initiate pulse 150, but of a longer duration. The mode pulse 152 repeats at regular intervals as shown by the portion of the curve designated 152*c***.

The mode pulse indicates that the computer is in a read-write cycle and its application to the circuit will be discussed in greater detail. For purposes which will be understood upon a return to the discussion of FIg. 4, FIG. 5 also depicts the output pulse from gate 160, designated by numeral 161, and a memory busy pulse 153 which is generated by the circuitry of FIG. 4B and extends from the beginning of the initiate pulse 150 and ends at the trailing edge **151*b* of the write enable pulse 151**.

The mode pulse 152 is applied to the circuit of FIG. 4B at terminal 155 and the input of inverter 160. The mode pulse goes high at the leading edge of the initiate pulse and thus is initially high for each memory cycle. Accordingly, the output of inverter 160 is initially low for each memory cycle and is applied to one of the inputs of gate 162. The write enable pulse is connected to input terminal 156 and provides the second input to gate 162 and, at the beginning of the memory cycle, is in a high logical state. Since one of the inputs to gate 162 is low initially in a memory cycle, its output is initially high and provides one of the inputs to gate 163. The output signal from gate 162 is the memory busy signal designated 153 in FIG. 5. The memory busy signal 153 produced by gate 162 will stay high until both of the inputs to gate 162 are high. When the mode pulse goes low, the inverter 160 will begin to charge the capacitor 164 and accordingly the signal 161 applied to the gate 162 from the inverter 160 will begin to go high. However, before the signal voltage 161 can rise sufficiently to cause the memory busy output signal 153 of gate 162 to go low, the other input of gate 162 goes low as a result of the write enable pulse 151 applied from input 156. Thus, the memory busy output 153 of gate 162 stays high until the write enable pulse 151 again goes high at which time both inputs to gate 162 will be low. Accordingly, when the write enable pulse 151 goes high at trailing edge **151*b*, the memory busy output 153 of the gate 162 will go low. The memory busy signal 153 will stay low until the output signal 161 of inverter 160 across capacitor 164 goes low in response to the mode pulse 152 going high at the start of the next memory cycle. Thus, the memory busy signal 153 at the output of gate 162 will be high from the start of each memory cycle to the trailing edge 151*b* of the write enable pulse at the end of the memory cycle and then will be low until the start of the next memory cycle when the leading edge 150*a*** of the next initiate pulse occurs. Accordingly, the memory busy signal is high during each memory cycle and is low between memory cycles.

The critical enabling voltage applied to the read-write current regulators is in circuit with terminal 165 across a voltage divider having resistors 166 and 167 connected in series to a source of reference potential 168.

Feedback at a logical high level representing the presence of the critical enabling voltage is provided from the common junction between resistors 166 and 167 by way of lead 170 to provide the second input to gate 163. When the read-write current regulators are operative, this signal is high so that the output from gate 163 is low during a memory cycle and becomes high when the memory busy signal 153 goes low at the end of the memory cycle. The output from gate 163 is provided by way of lead 171 to provide one of the inputs to gate 173. Thus, during normal operation the signal on lead 171 will be low during each memory cycle and will be high between memory cycles.

Since the input to gate 173 from capacitor 147 is low during normal operation of the computer, the output of gate 173 is high during normal operation. In order for the critical enabling voltage of the read-write current regulators to be on, transistors 177, 176 and 190 must be conducting. The base of transistor 177 is connected to the anode of a zener diode 178 shown in FIG. 4A and to a biasing resistor 195 which is also connected to ground 196. Transistor 177 is biased to be normally conductive.

Transistor 176 is rendered conductive by a high signal at its base on lead 175 from the output of gate 173. When transistor 176 conducts, the output from its collector to the base of transistor 190 through resistor 192 causes PNP-transistor 190 to conduct. The base of transistor 190 is also connected to a source of potential, for example +15 volts, through resistor 191, while its emitter is connected to terminal 197 through a diode 193. The collector output of transistor 190 provides the critical enabling voltage to the read-write current regulators hereinafter referred to as 15C.

When a loss of power occurs, the output from AND-gate 28 switches to a low state. That output is provided from lead 113 by way of lead 174 to the input of inverter 145 having an output which switches to a high state. However, the output of gage 145 does not immediately go to a high state because of the presence of a capacitor 147. Accordingly, the output from inverter 145 begins to rise. When the output of the inverter 145 has risen to an enabling value, the output of the gate 173 will go low if the signal applied to the other input of gate 173 on lead 171 is high. If the input to gate 173 on lead 171 is low, the output of gate 173 will remain high until the signal on lead 171 goes high. As pointed out above, during normal operation the signal on lead 171 will be low during each memory cycle, and will be high between memory cycles. Accordingly, should the output signal of the inverter 145 rise to the enabling value between memory cycles, the output signal of the gate 173 would then immediately go low. If on the other hand, the output of the inverter 145 should rise to the enabling value during a memory cycle, the output of the gate 173 will not go low until the end of the memory cycle when the signal on lead 171 goes high. When the output of gate 173 on lead 175 goes low, the transistor 176 will be rendered nonconductive. WHen transistor 176 is cut off, transistor 190 is also cut off, thereby cutting off the 15C critical enabling voltage through lead 165. Thus, when the loss of power occurs during a memory cycle, the 15C will be cut off at the end of the memory cycle and the read-write current regulators will be disabled at the end of the memory cycle. If a loss of power occurs between memory cycles and the output voltage of inverter 145 across capacitor 147 rises to the enabling value between memory cycles, the 15C will be cut off and the read-write current regulators will be disabled immediately upon the output signal of the inverter 145 rising to the enabling value. Should the loss of power occur just before the start of a memory cycle so that the output of inverter 145 does not rise to the enabling value until after the start of a memory cycle, the 15C will not be cut off until the end of the new memory cycle.

When the 15C voltage is cut off, the feedback signal on lead 170 switches to a low state. Therefore, the output from gate 163 will be maintained in a high state following the cut off of 15C.

In order for the 15C voltage to be turned on, transistor 176 and transistor 177 must be conducting. The base of transistor 177 is connected to a zener diode 178 which in turn is connected to a biasing resistor 179 in series with a source of supply voltage provided at terminal 180 and to zener diode 70 through diode 180*a*. This circuitry is provided to cut off transistor 177 and thus cut off 15C should the static voltage across diode 70 drop to a level at which the logic detection is no longer predictable.

The initiate pulse from the computer is provided to terminal 201 and to the base of transistor 204 through resistor 202. The resistor 202 is also connected to a diode 203 which is connected to the input of inverter 139. The base of transistor 204 is also connected to a diode 186 which is in circuit with the output of gate 163. In normal operation, the high output signal from gate 163 renders diode 186 nonconductive, while the high output at the input to gate 139 renders diode 202 nonconductive. When diodes 186 and 203 are not conducting, the initiate pulses which appear at terminal 201 cause transistor 204 to conduct to actuate a mode single-shot circuit (not shown) connected to terminal 205. The mode single shot, which may be a monostable multivibrator circuit, generates the mode pulse 152 shown in FIG. 5.

The collector of transistor 204 is connected to a +5 volt source of potential at terminal 208 through resistor 209. Resistor 209 is also connected to a capacitor 210 which sharpens the pulse provided to the mode single shot. The emitter of transistor 204 is connected through diode 181 to the collector of transistor 176. Lead 182 and resistor 184 connect the emitter of transistor 204 to zener diode 70.

When the output of gate 163 is low, when the initiate pulse is generated, or when the input to gate 139 is low, i.e. during warmup before all of the sources have reached their nominal voltage, one of the diodes 186 or 202 will be conductive and inhibit the initiate pulse from turning on transistor 204.

It should be noted that the circuit operates to protect the memory in two ways: first, by inhibiting the initiate pulse and second by removing the critical voltage 15C applied to the memory. Inhibiting either the initiate pulse or the controlling voltage 15C will be sufficient to prevent the memory readout and restore cycle from occurring.

Figure 6:
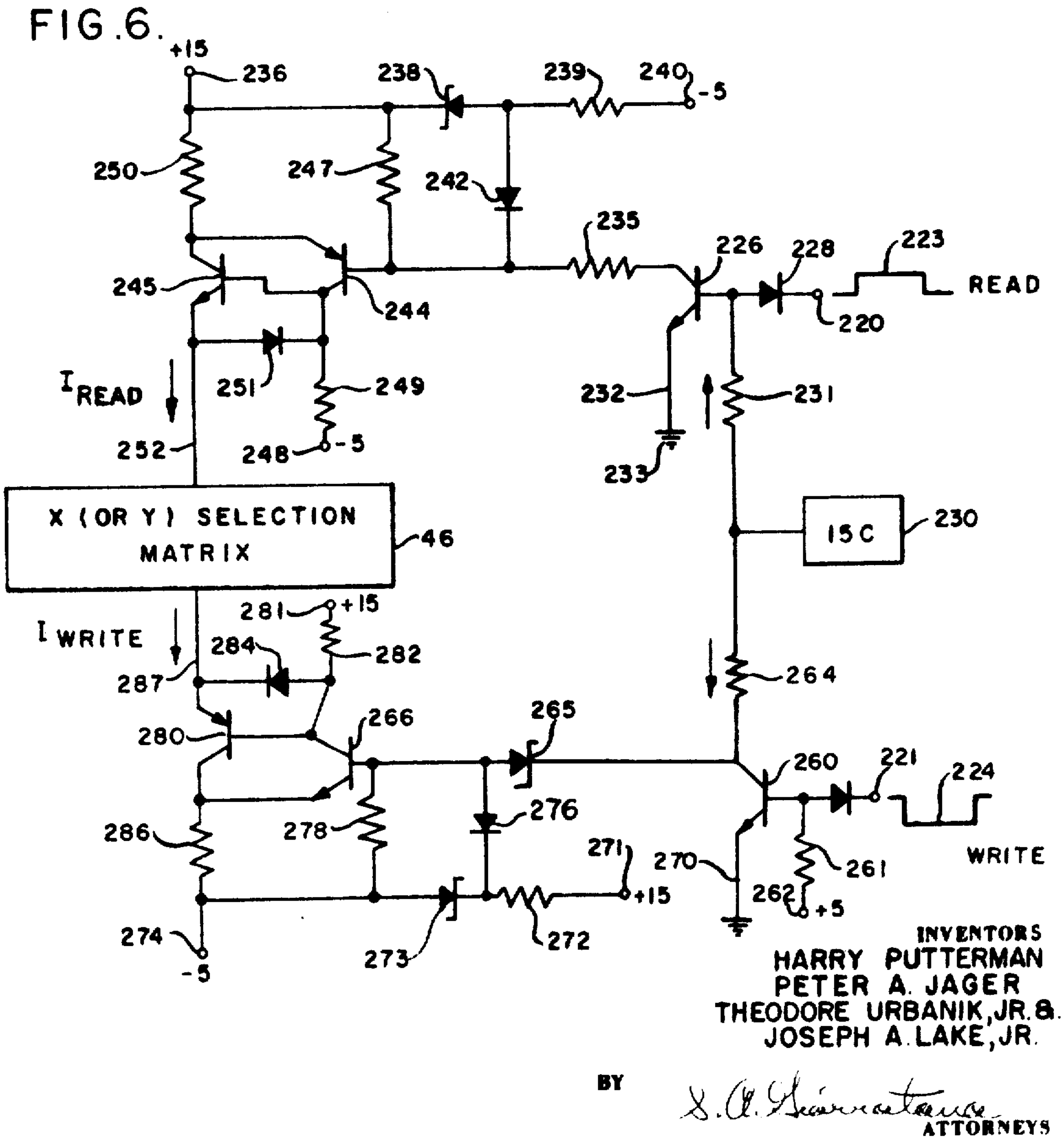

FIG. 6 depicts an illustrative read and write current regulator which generates the currents required for reading from and writing into the core memory. The read-write regulator circuit, for example, corresponding to read-write driver 44 and 49 in FIG. 3 is connected to an X- or Y-selection matrix, for example, corresponding to the X-selection matrix 46 or the Y-selection matrix 51 in FIG. 3. The respective input pulses are provided at the read input terminal 220 and the write input terminal 221 respectively. The portions of the read pulse and the write pulse are shown by the portions of the waveforms 223 and 224 respectively. The read pulse 223 precedes the write pulse 224 in time so that data stored in the core memory 42 may be read out into register 54 and returned to the core memory 42 when the write pulse 224 is present. In its quiescent state, transistor 226 is biased to its off state.

Transistor 226 has its base connected to a diode 228 and to the 15C critical voltage 230 through resistor 231. The 15C voltage causes diode 228 to conduct and draw current away from the base of the normally nonconductive transistor 226.

Transistor 226 has its emitter connected to ground 233 and its collector connected to a resistor 235. The +15 volt source is connected to terminal 236 which forms a series circuit with a zener diode 238, a resistor 239 and the −5 volt source connected to terminal 240. A diode 242 is connected to the common junction between the zener diode 238 and resistor 239 and to one terminal of resistor 235. When transistor 226 is conducting, the potential at the anode of the zener diode 238 is about +10 volts, so that diode 242 is conductive and the potential at its cathode is about +10 volts. When transistor 226 is not conducting, transistors 244 and 245 are not conducting. Transistor 244 has its base connected to the +15 volt source at terminal 236 through resistor 247, its emitter connected tot h collector of transistor 245 and its collector connected to a −5 volt supply at terminal 248 through collector resistor 249.

Transistor 245 has its collector connected to terminal 236 through resistor 250 and its emitter connected to the selection matrix 46. A portion of the selection matrix is biased by the −5 volt source at terminal 248 through resistor 249, diode 251, and lead 252.

When the read pulse 223 occurs, diode 228 is cut off and transistor 226 conducts causing transistors 244 and 245 to conduct. When transistor 245 conducts, a series current path from the +15 volt source, the collector-emitter path of transistor 245 and lead 252 is enabled. Current flowing in this stated path is directed by the matrix 46 to the selected windings of the core matrix.

The circuit which produces the write current is similar to the read current circuit. Transistor 260 is biased for conduction by the connection of its base through resistor 261 to the +5 volt source of potential at terminal 262. The collector of transistor 260 is connected to a resistor 264 which is in circuit with the 15C voltage source and with a zener diode 265 which is connected to the base of transistor 266. The emitter of transistor 260 is biased to ground 267.

A series biasing circuit comprises the +15 volt source of potential at terminal 271, resistor 272, zener diode 273, and the −5 volt source at terminal 274. A diode 276 is connected between zener diode 273 and zener diode 265 while a resistor 278 is connected from the base of transistor 267 to the anode of zener diode 273.

The collector of transistor 266 is connected to the base of transistor 280 and to the +15 volt source at terminal 281 through resistor 282. The selection matrix is also biased from the same source at terminal 281 and resistor 282 through diode 284. The emitter of transistor 266 is connected to the −5 volt source at terminal 274 through resistor 286.

When a negative-going write pulse is provided to terminal 221, transistor 260 is cut off. Thus, the potential at the base of transistor 266 is clamped to about +10 volts through diode 276, resistor 272 and the +15 volt source at terminal 271, and transistor 266 is turned on, causing transistor 280 to become conductive.

WHen transistor 280 becomes conductive, write current flows in the series path comprising the −5 volt source at terminal 274, the resistor 286, the collector-emitter path of transistor 280 and lead 287.

When the 15C critical voltage is cut off, the base current for transistor 226 is removed and collector current for transistor 260 is removed. Accordingly, base current to both transistors 244 and 266 is cut off and the read-write current regulator is rendered inoperative.

Thus, a memory protection circuit for a destructive readout memory core which has a number of capabilities has been disclosed and described in detail.

We claim:

1. In a computer having a destructive readout core memory and a plurality of sources of power to said memory, a memory protection circuit comprising:
   - means for sensing the output of each of said sources of power and providing a first signal which indicates that such source of power is at least at a predetermined level, and
   - gating means connected to said sensing means for receiving said signals and for providing a second signal which indicates that all of said sources of power are at least at a predetermined level, said gating means including means for providing a third signal which indicates that at least one of said sources of power is not at least at a predetermined level.

2. The memory protection circuit as defined in claim 1 wherein said sensing means includes a plurality of sensing circuits, each including an input circuit coupled with one of said sources of power, and an output circuit for producing a signal which indicates that the source of power is at least at a predetermined level.

3. The memory protection circuit as defined in claim 2 wherein each sensing circuit includes a normally nonconductive stage and means for causing said stage to conduct and produce an output signal when said source of power is at least at a predetermined minimum.

4. The memory protection circuit as defined in claim 1 wherein said gating means includes a gate circuit including an input connected to the output of said sensing means for receiving said first signal and an output for providing said second signal.

5. The memory protection circuit as defined in claim 4 further including means for delaying said second signal for a predetermined time.

6. The memory protection circuit as defined in claim 2 wherein said gating means includes a gate circuit comprising a plurality of inputs respectively connected to the outputs of said sensing circuits and an output circuit for providing said second signal only when all of said sources of supply voltage are at least at a predetermined level.

7. In a computer having a destructive readout core memory and a plurality of sources of power to said memory, a memory protection circuit comprising:
   - means for sensing the output of each of said sources of power and providing a first signal which indicates that such source of power is at least at a predetermined level,
   - first means connected to said sensing means for receiving said signals and for providing a second signal which indicates that all of said sources of power are at least at a predetermined level, and
   - second means connected to said first means for providing a third signal which indicates that at least one of said sources of power is not at least at a predetermined level.

8. In a computer having a destructive readout core memory, a plurality of sources of power to said memory, a core selection matrix connected to said core memory, readout means for carrying out a read and restore cycle whereby data is read out from said core and returned thereto in a predetermined sequence, said readout means being enabled to perform a read and restore cycle by a critical enabling voltage applied thereto, a memory protection circuit comprising:
   - means for sensing the output of each of said sources of power and providing a first signal which indicates that such source of power is at least at a predetermined level,
   - first means connected to said sensing means for receiving said signals and for providing a second signal which indicates that all of said sources of power are at least at a predetermined level, and
   - means responsive to said second signal for cutting off said critical enabling voltage applied to said readout means when one of said sources of power to said memory is not at least at a predetermined level.

9. The memory protection circuit as defined in claim 8 wherein said means for cutting off said critical enabling voltage includes a circuit element supplying said critical enabling voltage to said readout means and means responsive to said second signal for causing said circuit element to supply said critical enabling voltage when all of said sources of power are at least at a predetermined level and to cut off said critical enabling voltage when one of said sources of power is not at its predetermined level.

10. The memory protection circuit as defined in claim 8 further including means for permitting the completion of any read and restore cycle which is in progress by said readout means when one of said sources of power falls below the predetermined level for such source of power.

11. In a computer having a destructive readout core memory, a plurality of sources of power to said memory, a core selection matrix connected to said core memory, readout means for carrying out a read and restore cycle whereby data is read out from said core and returned thereto in a predetermined sequence, a memory protection circuit comprising:

means for sensing the output of each of said sources of power and providing a first signal which indicates that such source of power is at least at a predetermined level, first means connected to said sensing means for receiving said signals and for providing a second signal which indicates that all of said sources of power are at least at a predetermined level, and means responsive to said second signal for inhibiting the initiation of a read and restore cycle by said readout means when one of said sources of power to said memory is not at least at a predetermined level.

12. The memory protection circuit as defined in claim 11 further including means for permitting the completion of any read and restore cycle which is in progress by said readout means when one of said sources of power drops below the predetermined level for such source of power.

13. In a computer having a destructive readout memory, and readout means to readout data from said memory and to restore the data readout from said memory back into said memory in a read and restore cycle, said memory and said readout means including a plurality of sources of power, a memory protection circuit comprising: means for sensing the output of each of said sources of power and providing a signal to indicate that such source of power is at least at a predetermined level, and means connected to said sensing means responsive to the output signals thereof to disable said readout means from reading out from said memory in response to one of said sources of power being below the predetermined level for such source of power.

14. The memory protection circuit as defined in claim 13 further including means for permitting the completion of any read and restore cycle which is in progress by said readout means when one of said sources of power drops below the predetermined level for such source of power.

* * * * *